United States Patent [19]

Halbauer

[11] Patent Number: 4,463,298
[45] Date of Patent: Jul. 31, 1984

[54] INSTRUMENT FOR KEEPING THE DISTANCE CONSTANT BETWEEN A TOOL AND A WORKPIECE TO BE PROCESSED

[75] Inventor: Klaus Halbauer, Dreieich, Fed. Rep. of Germany

[73] Assignee: Messer Griesheim GmbH, Frankfurt am Main, Fed. Rep. of Germany

[21] Appl. No.: 283,729

[22] Filed: Jul. 15, 1981

[30] Foreign Application Priority Data

Aug. 6, 1980 [DE] Fed. Rep. of Germany ....... 3029743

[51] Int. Cl.³ .............................................. G05B 1/06
[52] U.S. Cl. ............................... 318/662; 219/124.02; 266/76
[58] Field of Search .......................... 266/76; 318/662; 219/124.02, 124.03, 124.4

[56] References Cited

U.S. PATENT DOCUMENTS

| 3,970,911 | 7/1976 | Schmall | 318/662 X |
| 4,263,546 | 4/1981 | Morris | 318/662 X |
| 4,298,784 | 11/1981 | Schaall | 318/662 X |
| 4,300,226 | 11/1981 | Barnette | 318/662 X |

Primary Examiner—B. Dobeck
Attorney, Agent, or Firm—Connolly and Hutz

[57] ABSTRACT

An instrument for maintaining a constant distance between a tool, such as a cutting torch, and a workpiece includes a sensing electrode connected to two different phase control system-building blocks one of which functions as an oscillator having its output connected to the input of the other phase control system-building block.

2 Claims, 1 Drawing Figure

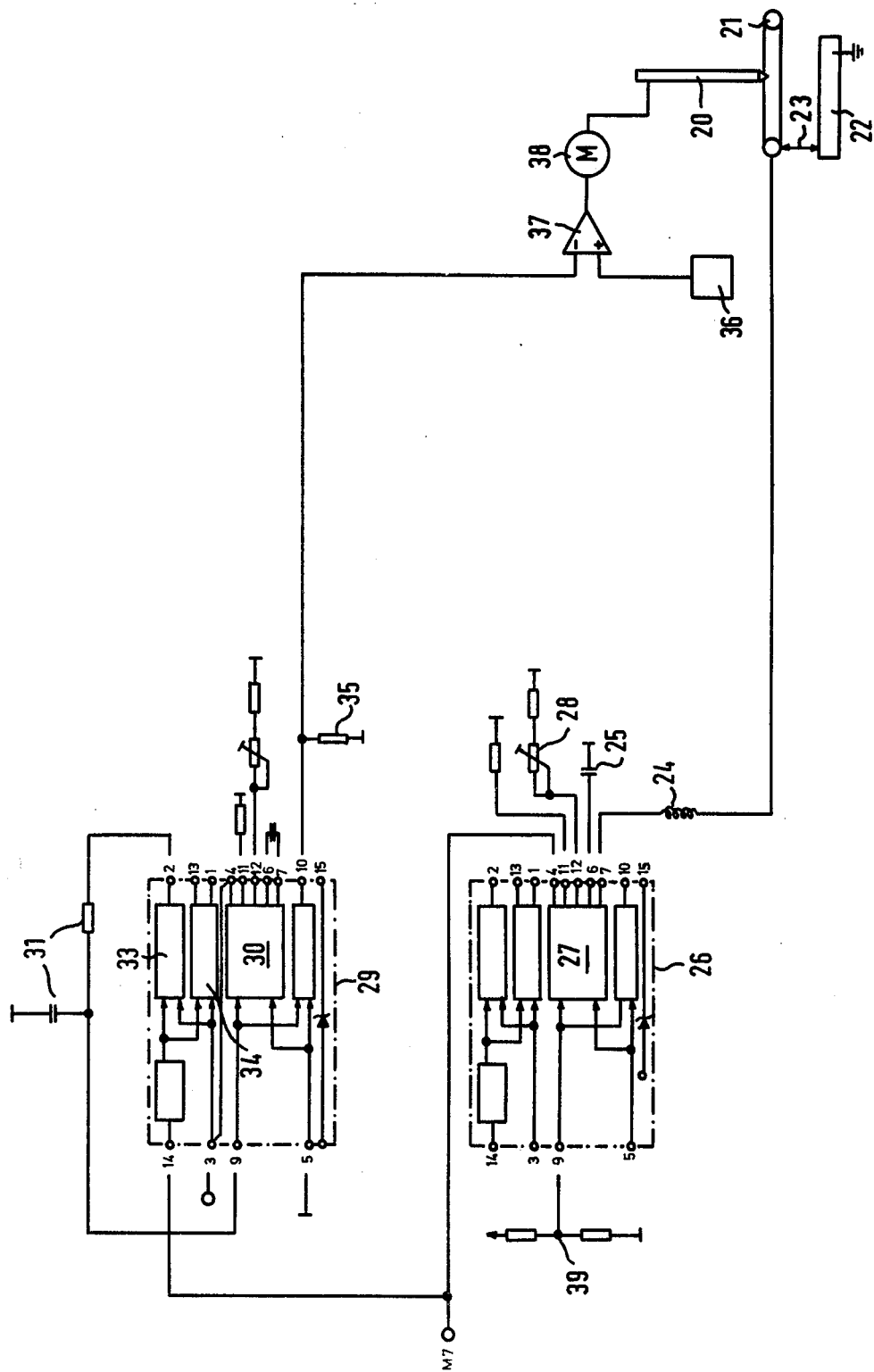

INSTRUMENT FOR KEEPING THE DISTANCE CONSTANT BETWEEN A TOOL AND A WORKPIECE TO BE PROCESSED

BACKGROUND OF INVENTION

The present invention relates to an instrument for maintaining the distance between a tool and a workpiece to be processed constant, in particular, for keeping the distance constant between a cutting torch of a flame cutting machine and a workpiece, with a distance change-detecting capacitor formed by a sensing electrode preferably connected to the torch and by the workpiece surface and which is connected to a first phase control system-building block with an incorporated set point-actual value comparing device and a torch adjusting device.

An arrangement of the above type is disclosed in German Preliminary Application DE-OS No. 27 44 362. With this capacitive height adjusting instrument, a considerable control accuracy is attained with the use of a phase control system since even the smallest capacity variations lead to relatively large output signal changes and the torch height adjusting device can be accurately adjusted. Practical use has demonstrated, however, that the temperatures (20°–60° C.) occurring near the height control during flame cutting lead to a mistuning of the phase control system as a result of which the desired control accuracy is not always guaranteed.

SUMMARY OF INVENTION

It is an object of the present invention to provide an instrument of the above-mentioned type which supplies temperature-independent control signals.

In order to meet this object, it is proposed according to the invention that the sensing electrode be connected to a second phase control system-building block which functions as an oscillator, the output of which is connected to the input of the first phase control system-building block.

According to the invention, a temperature-stable height control is attained since the two phase control system (PLL)-building blocks are constructed the same way and as a result of the proposed arrangement, the heat drift of the two building blocks is evaluated in opposite directions and conseqently is compensated.

THE DRAWING

The single FIGURE schematically illustrates a preferred embodiment of the invention.

DETAILED DESCRIPTION

The instruments with which the invention is concerned are used, in particular, for keeping the distance constant between a cutting torch of a flame cutting machine and a workpiece. Such instruments have a distance change-detecting capacitor formed by a sensing electrode preferably connected to the torch and by the workpiece surface and which is connected to a first phase control system-building block with an incorporated set point value-actual value comparing device and torch adjusting device. In accordance with the invention, in order to attain a temperature-independent constant distance maintenance, the sensing electrode is connected to a second phase control system-building block which functions as an oscillator, the output of which is connected to the input of the first phase control system-building block.

More specifically, as shown in the drawing, the instrument according to the invention essentially consists of a cutting torch 20 connected to a sensing electrode 21 which is moved over a workpiece 22 to be processed. A capacitor is formed in this process by the sensing electrode 21 and the workpiece 22, the capacity of which fluctuates in the micro-micro farad range depending on the dimension of the distance 23 of the torch/sensor to the workpiece.

The sensing electrode 21 is connected together with an inductance 24 and a capacitor 25 to the input 6, 7 of a phase control system (PLL)-building block 26 which functions as an oscillator. The (PLL)-building block 26 only utilizes the voltage control oscillator (VCO) 27, the input 9 of which is connected to a 15 Volt DC supply 39. The output frequency of the VCO 27—measured at the connection M 7—is adjusted with the resistance 28 in such a way that the resonance frequency of the resonant circuit (inductance 24, sensing electrode 21, capacitor 25) is exactly twice as high as the frequency measured in point M 7. This frequency is approximately 600 KHz.

The output 4 of the VCO 27 is connected to a phase control system (PLL)-building block 29. This includes, in addition to a VCO 30, a low pass 31, an amplifier 32 as well as phase comparators 33, 34.

The (PLL)-building block 29 measures the mistuning of the resonant circuit 21, 24, 25 and a potential proportional to the mistuning is issued via resistance 35. A comparison tension for determining the basic height (desired distance 13) of the sensing electrode 21 is adjusted with the set point setting means 36. The comparison tension is added at the operation amplifier 37 to the measuring tension from the (PLL)-building block 29. The output signal of the amplifier 37 is supplied to a motor 38 which can move the cutting or welding torch 20 and the sensing electrode 21 into the desired set point distance.

The (PLL)-building blocks 26 and 29 are constructed in the same way and may be building blocks as sold by the Motorola Company under the designation MC 14046. Both building blocks have the same properties and are wired together according to the proposed arrangement in such a way that the heat drift of the two (PLL)-building blocks is evaluated in opposite directions. This results in the production of a temperature-independent height adjustment.

What is claimed is:

1. In an instrument for maintaining a constant distance between a tool and a workpiece to be processed wherein the instrument has a distance change-detection capacitor formed by a sensing electrode and by the workpiece surface and which is connected to a first phase control system-building block with an incorporated set point-actual value comparing device and tool adjusting device, the improvement being said sensing electrode being connected to a second phase control system-building block which functions as an oscillator, and the output of said second phase control system-building block being connected to the input of the first phase control system-building block whereby a temperature-independent height adjustment is achieved by a single capacitor formed by said electrode and the workpiece.

2. In the instrument of claim 1, in combination therewith, said tool being a cutting torch of a flame cutting machine, and said sensing electrode being connected to said torch.

* * * * *